(12) United States Patent
Ma et al.

(10) Patent No.: US 8,751,807 B2
(45) Date of Patent: Jun. 10, 2014

(54) METHOD AND SYSTEM FOR SECURE OVER-THE-TOP LIVE VIDEO DELIVERY

(75) Inventors: Kevin J Ma, Nashua, NH (US); Robert Hickey, Bedford, MA (US); Paul Tweedale, Andover, MA (US)

(73) Assignee: Azuki Systems Inc., Acton, MA (US)

( * ) Notice: Subject to any disclaimer, the term of this patent is extended or adjusted under 35 U.S.C. 154(b) by 22 days.

(21) Appl. No.: 13/530,997

(22) Filed: Jun. 22, 2012

(65) Prior Publication Data

US 2012/0331293 A1   Dec. 27, 2012

Related U.S. Application Data

(60) Provisional application No. 61/500,316, filed on Jun. 23, 2011.

(51) Int. Cl.
  *H04L 9/32* (2006.01)
(52) U.S. Cl.
  USPC ........................................... 713/168
(58) Field of Classification Search
  None
  See application file for complete search history.

(56) References Cited

U.S. PATENT DOCUMENTS

2007/0038857 A1 *  2/2007  Gosnell ..................... 713/165

FOREIGN PATENT DOCUMENTS

WO   2010108053 A1   9/2010
WO   2011020088 A1   2/2011

OTHER PUBLICATIONS

Iphone HTTP Live Streaming: http://tools.ietf.org/html/draft-pantos-http-live-streaming-06, Mar. 31, 2011.
Silverlight smooth streaming: http://download.microsoft.com/download/7/6/D/76D540F7-A008-427C-8AFC-BE9E0C0D8435/Using_Silverlight_with_Windows_Media_DRM-Whitepaper_FINAL.doc, Nov. 2008.

* cited by examiner

*Primary Examiner* — Brandon Hoffman
(74) *Attorney, Agent, or Firm* — BainwoodHuang

(57) ABSTRACT

A method is provided for managing key rotation (use of series of keys) and secure key distribution in over-the-top content delivery. The method provided supports supplying a first content encryption key to a content packaging engine for encryption of a first portion of a video stream. Once the first content encryption key has expired, a second content encryption key is provided to the content packaging engine for encryption of a second portion of a video stream. The method further provides for notification of client devices of imminent key changes, as well as support for secure retrieval of new keys by client devices. A system is also specified for implementing a client and server infrastructure in accordance with the provisions of the method.

38 Claims, 3 Drawing Sheets

METHOD AND SYSTEM FOR SECURE OVER-THE-TOP LIVE VIDEO DELIVERY

SUMMARY

This invention relates in general to over-the-top (OTT) media delivery and more specifically to encryption key rotation for live streaming media.

As content delivery models move away from streaming distribution over private networks to Web-based delivery of files over the public Internet, referred to as over-the-top (OTT) delivery, traditional content protection paradigms must be modified to support new delivery protocols, e.g., HTTP Live Streaming. For live streaming content with long or indefinite durations, use of a single encryption key for the entire duration increases the probability that the key may be compromised. Traditional key rotation schemes used in private multiple system operator (MSO) and mobile network operator (MNO) distribution networks, where physical security protects the key distribution path, do not extend to use over the public Internet, where communications channels are more susceptible to attack. Furthermore, the encryption used with nascent segment-based HTTP distribution protocols (e.g., HTTP Live Streaming, Silverlight Smooth Streaming, MPEG/3GP Dynamic Adaptive Streaming over HTTP (DASH), etc.) also differs from traditional streaming techniques. Encryption of non-segmented content is typically performed using a single encryption key using a single continuous pass over the content, from start to finish. For segment-based formats, each segment may use the same content encryption key. Though the content encryption key may be salted with a unique initialization vector (IV) for each segment, the IV is not random and provides only limited security.

Methods and apparatus are disclosed for managing the distribution of a plurality of content encryption keys for use in the protection of live streaming content. A disclosed method includes generating a series of content encryption keys and providing them serially to a packaging server for encrypting a content item, wherein each content encryption key is provided upon expiration of a period of use of a serially preceding content encryption key. The packaging server generates packaged content for delivery to client devices via a content delivery network, the packaged content including or accompanied by key expiration information usable by the client devices to identify transitions between sections of the packaged content encrypted by different ones of the content encryption keys. The method further includes providing the content encryption keys to a license server for delivery to the client devices for use in decrypting the content item. The license server is operative to establish that a requesting client device is authorized to access the content item, and further operative to securely deliver the content encryption keys to a requesting client device whose authorization to access the content item has been established. The transitioning between use of different keys is also referred to herein as key "rotation".

A workflow management system, referred to herein as a workflow manager, is responsible for managing the acquisition of source content from a content management system, preparation of the content, including, but not limited to, transcoding of the content into different encodings (e.g., different bitrates, frame rates, resolutions, sample rates, codecs, etc.), storing the transcoded content in different formats (e.g., 3GP, segmented 3GP, MP4, fragmented MP4, MPEG-TS, segmented MPEG-TS, RTP, etc.), and encrypting the different formats, so that the content is suitable for delivery to a plurality of client devices over a plurality of network infrastructures. The prepared content is then uploaded to a CDN for delivery to clients. Provisions are included for managing when content encryption keys expire, distributing content encryption keys to packaging engines, and distributing content encryption keys to clients.

In the preparation and distribution of content, specifically video content, modern protocols (e.g., HTTP Live Streaming, Silverlight Smooth Streaming, MPEG/3GP Dynamic Adaptive Streaming over HTTP (DASH), etc.) employ segment-based rate adaptation to deal with fluctuations in bandwidth, whereby segment boundaries provide natural demarcation points for switching bitrates. Another example of a protocol and file format suitable for segment-based rate adaptation is described in PCT Application No. PCT/US2010/027893 filed Mar. 19, 2010, and entitled, Method for Scalable Live Streaming Delivery for Mobile Audiences. Yet another example of a protocol and file format suitable for segment-based rate adaptation is described in PCT Application No. PCT/US2010/028309 filed Mar. 23, 2010, and entitled, Method and System for Efficient Streaming Video Dynamic Rate Adaptation. There are many protocols and methods for generating segmented content, as should be known to those skilled in the art. Any of these segmentation methods are suitable for use in accordance with provisions of the invention. For segment-based formats (e.g., segmented 3GP, fragmented MP4, segmented MPEG-TS, etc.), each segment is independently playable, and therefore needs to be independently encrypted and decryptable. Segments are typically of a fixed duration and, in the case of video content, begin with a key-frame and contain no inter-segment references. Segmentation is performed on each of the different encoding generated by the transcoder, by parsing the resultant encoding and determining segment boundaries. In one embodiment segment boundaries are based on a fixed number of bytes of data. In another embodiment segment boundaries are based on a fixed number of video key frames.

Segments are encrypted on segment boundaries using the current content encryption key and current initialization vector (IV). In one embodiment, the IV may be a simple incrementing integer value. In another embodiment, the IV may be a pseudo-random stream of bits produced by a pseudo-random number generator or stream cipher. Though the IV provides some additional cryptographic strength, it is not random. The generation of new strongly random values for use as content encryption keys and the rotation of content encryption keys provides protection from content encryption keys being compromised in long lived streams. In one embodiment, IVs are reinitialized whenever a content encryption key is rotated. In another embodiment, IVs are not reinitialized when content encryption keys are rotated.

In one embodiment the workflow manager generates content encryption keys with a fixed duration lifespan on a fixed periodic basis. In one embodiment, the content encryption keys may be generated using weak sources of entropy (e.g., processor or wall clock time, /dev/urandom, etc.). In another embodiment, the content encryption keys may be generated using strong sources of entropy (e.g., hardware sources which rely on electrical static or radioactive decay, /dev/random/, etc.). There are many ways to generate random numbers, as should be known to those skilled in the art. Any method for generating random numbers may be used in accordance with provisions of this method. The workflow manager distributes the content encryption keys and content encryption key lifespan to both a license server and content packaging engine, referred to herein as a packager. The fixed duration lifespan is directly correlated to a fixed period of the live content. The changing of content encryption keys based on the fixed period of the live content is referred to herein as rotation. A history of individual content encryption keys and the order in which they were generated is maintained. Each content encryption key in the history is assigned a unique identifier which is referred to herein as the content encryption key identifier. In one embodiment, the content encryption key identifiers are selected based on the wall clock time offset from the beginning of the live stream. In another embodiment, the content encryption key identifiers are selected based on a segment number of the prepared content. In one embodiment the segment boundaries are based on a fixed number of bytes of data. In another embodiment the segment boundaries are based on a fixed number of video key frames. The content packaging engine is responsible for encrypting the associated content using the content encryption key. In one embodiment, the packager recognizes the imminent end to the fixed duration lifespan and requests a new content encryption key from the workflow manager. The license server is responsible for distributing content encryption keys to clients. In one embodiment, the license server also distributes fixed duration lifespan information to clients. In one embodiment, when initiating playback of the stream, the client requests the current content encryption key, the next future content encryption key, and the fixed duration lifespan of the keys. The client uses the content encryption keys to decrypt the associated content.

In one embodiment, the workflow manager may initiate content encryption key rotation at any time, outside of the fixed duration lifespan of the existing key. The workflow manager is responsible for notifying the packager of the key rotation request. The packager is responsible for selecting when the new key shall be applied and notifying the workflow manager. In one embodiment, the point at which the key is applied is based on the wall clock time offset from the beginning of the live stream. In another embodiment, the point at which the key is applied is based on a segment number of the prepared content. In one embodiment the segment boundaries are based on a fixed number of bytes of data. In another embodiment the segment boundaries are based on a fixed number of video key frames. The workflow manager is then responsible for notifying the license server of the new content encryption key, the content encryption key identifier of the new content encryption key, and the lifespan of the new content encryption key. In one embodiment, content encryption key identifiers are selected based on the fixed period of the live content. In one embodiment, the content encryption key identifiers are selected based on the wall clock time offset from the beginning of the live stream. In another embodiment, the content encryption key identifiers are selected based on a segment number of the prepared content. In one embodiment the segment boundaries are based on a fixed number of bytes of data. In another embodiment the segment boundaries are based on a fixed number of video key frames. The packager is responsible for providing in-band notification to the client for the key change. In one embodiment, the notification is embedded in a manifest file that describes the encrypted content. In one embodiment, the manifest may be an m3u8 file. In another embodiment, the manifest may be a Smooth Streaming manifest file. In another embodiment, the manifest may be a DASH MPD file. In another embodiment, the notification is embedded in the segment file name of the encrypted content. In another embodiment, the notification is embedded in a header prepended to the encrypted content. In one embodiment, the header may be a Microsoft PlayReady header. In another embodiment, the header may be an MPEG/3GP DASH header. In another embodiment, the header may be a proprietary segment format header.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

In this description the term "server" refers to a general-purpose or special-purpose computer, generally including memory, input/output circuitry, and instruction processing logic along with interconnections such as one or more high-speed data buses connecting those components together. Many aspects of the disclosed techniques can be embodied as one or more server computers executing software. Similarly, a "client" herein is a computerized device (also including the above components and executing software) capable of receiving content from a network connection and decoding and rendering the content on a display or similar output device. So-called smartphones are specifically included within the definition of client as used herein.

Figure 1:
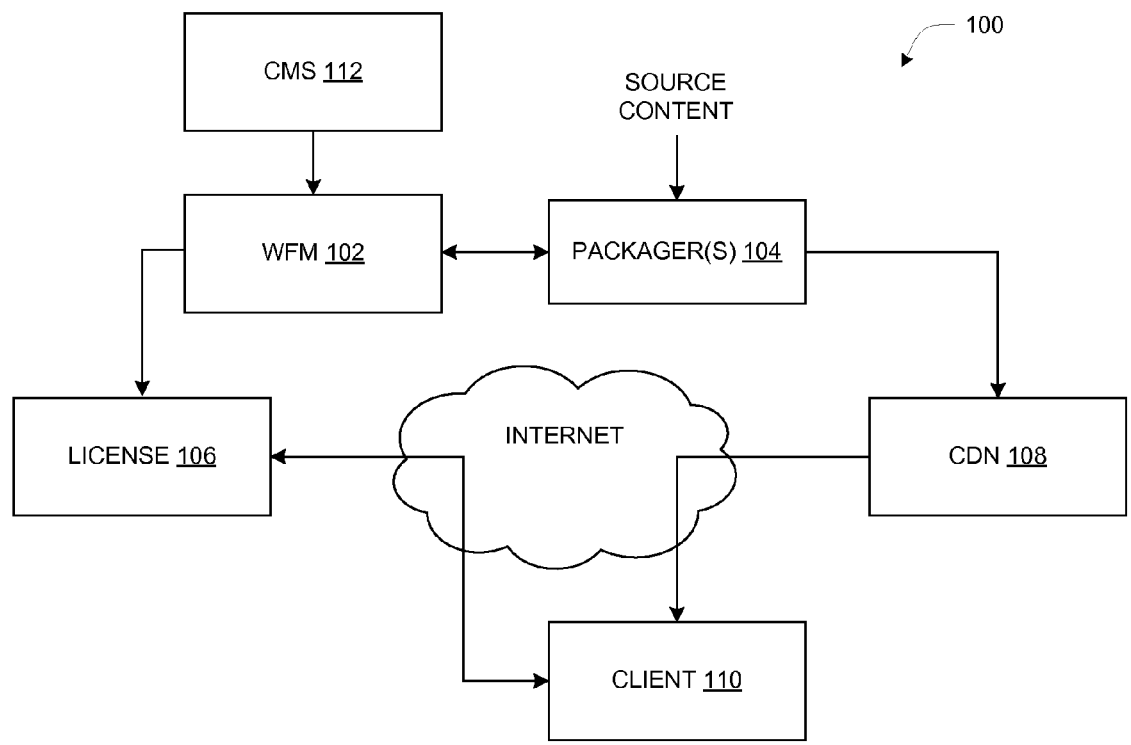
FIG. 1 is a block diagram of a content delivery system.

In FIG. 1 is a block diagram of a system 100 for one embodiment of the present invention. As shown, it includes a workflow manager (WFM) 102, one or more packaging servers or "packager(s)" 104, a license server 106, a content delivery network (CDN) 108, client devices or "clients" 110, and a content management system (CMS) 112. Generally in operation, the packager(s) 104 receive source content and process or "package" the source content so that it may be delivered to the clients 110 via the CDN 108. Specifically, the packager(s) 104 perform content encryption using a series of content encryption keys as described below. The CMS 112 provides high-level control over content ingestion, packaging and delivery, while the WFM 102 performs more detailed control operations. The license server 106 is responsible for storing encryption keys and providing them to the clients 110 for use during playback, as described in more detail below.

The workflow manager (WFM) 102 is responsible for initiating ingestion and preparation of live content. In one embodiment, preparation includes transcoding audio and video into a plurality of encodings using different codecs, bitrates, frame rates, sample rates, and resolutions. The transcoded content is then written into a plurality of output files. In one embodiment, a plurality of output files contain the same transcoded content encapsulated in different container formats (e.g., 3GP, MP4, MPEG-TS, WMV, MOV, etc.). In one embodiment, the prepared output files are segmented into fixed duration segment files (e.g., MPEG-TS segments, fragmented MP4 segments, 3GP DASH segments, etc.). In one embodiment, the output files, both segmented and un-segmented, are encrypted using standard encryption protocols (e.g., AES-128, HC-128, RC4, etc.). In one embodiment, IVs for the encryption protocol are reinitialized by the packager 104 whenever a content encryption key is rotated. In another embodiment, IVs for the encryption protocol are not reinitialized when content encryption keys are rotated. In one embodiment, all preparation steps are performed by a single content packaging server or packager 104. In another embodiment, individual preparation steps (e.g., transcoding, segmentation, encryption, etc.) may be performed across different physical packaging servers 104. The packager 104 which performs encryption acquires content encryption keys from the workflow manger 102. In one embodiment the WFM 102 and packager 104 reside in the same physical server. In another embodiment, the WFM 102 and packager 104 reside in different physical servers in the same data center. In another embodiment, the WFM 102 and packager 104 reside in different physical servers in remote data centers.

The WFM 102 receives an ingestion request from the content management system (CMS) 112. The request specifies a security profile. In one embodiment, the security profile includes content encryption information, including cipher specification and content encryption key expiration policies. The WFM 102 generates an initial content encryption key and assigns it a content encryption key identifier. In one embodiment, the content encryption key identifier is initially set to zero and all future content encryption key identifiers are based on a relative offset to the initial content encryption key identifier. In one embodiment, the content encryption key identifiers are based off a next sequential integer value, offset from the previous content encryption key identifier. In another embodiment, the content encryption key identifiers are based off the wall clock time offset from the time the initial content encryption key identifier was generated. In another embodiment, the content encryption key identifiers are based off of segment numbers, as produced by the packager 104 during segmentation. In one embodiment the segment boundaries are based on a fixed number of bytes of data. In another embodiment the segment boundaries are based on a fixed number of video key frames.

The WFM 102 then initiates content preparation by assigning a packager 104 to begin acquiring the source content and performing transcoding and segmentation as required. The WFM 102 provides the initial content encryption key and lifespan of the key to the packager 104 responsible for encryption of the prepared outputs. The packager 104 encrypts the content using the initial content encryption key until it expires. In one embodiment, the expiration time is based on a relative wall clock time offset to the time preparation was started. In another embodiment, the content encryption key identifiers are based off of segment numbers, as produced by the packager 104 during segmentation. Segmentation detects segment boundaries and assigns a fixed amount of data to each individual segment. In one embodiment the segment boundaries are based on a fixed number of bytes of data. In another embodiment the segment boundaries are based on a fixed number of video "key frames" (e.g., I-Frames in MPEG encoding). In one embodiment, before the content encryption key expires, the packager 104 requests a new key from the WFM 102. In one embodiment, the new content encryption key has the same lifespan as the previous content encryption key. The new content encryption key is made available by the WFM 102 to the packager 104 before the previous content encryption key has expired to allow for uninterrupted encryption. In one embodiment, if the packager 104 is unable to obtain a new content encryption key from the WFM 102 prior to the expiration of the current content encryption key, the packager 104 will continue to use the current content encryption key until such time as it is able to obtain a new key from the WFM 102.

Encrypted content is uploaded by the packager 104 to a content delivery network (CDN) 108, from which it may be retrieved by clients 110. In one embodiment, manifest files are also uploaded by the packager 104 to the CDN 108. The clients 110 must first obtain the content encryption keys from the license server 106, before they may decrypt and render encrypted content. In one embodiment, clients 110 retrieve content encryption keys using HTTPS. Generally, the license server 106 is responsible for ensuring that a client device 110 is authorized to access any protected content before providing the encryption keys for such content to a requesting client 110. In one embodiment, clients 110 are verified by the license server 106 using client certificate verification. In another embodiment, clients 110 are verified using login credentials. The license server 106 is notified of new content encryption keys by the WFM 102 as they are generated. In one embodiment, the license server 106 stores the content encryption key, content encryption key identifier, content encryption key lifespan (or expiration), and the location of the encrypted content. In one embodiment, the information is stored as an encrypted token in a database. In one embodiment the WFM 102 and license server 106 reside in the same physical server. In another embodiment, the WFM 102 and license server 106 reside in different physical servers in the same data center. In another embodiment, the WFM 102 and license server 106 reside in different physical servers in different data centers. In one embodiment, the license server 106 registers client devices 110 and verifies the right of each client device 110 to view the content. If the client 110 has the right to view the content, the license server 106 provides the content encryption key, content encryption key lifespan (or expiration), and the location of the encrypted content.

In one embodiment, the WFM 102 may issue a new unsolicited content encryption key to the packager 104. In one embodiment, the WFM 102 pushes the new content encryption key to the packager 104 when the current content encryption key is nearing the end of its lifespan. In one embodiment, the new content encryption key is pushed ahead of the current content key expiration, and the packager 104 waits until the current content encryption key has expired before applying the new content encryption key. In another embodiment, the new content encryption key is pushed ahead of the current content key expiration with explicit instructions to apply the key as soon as possible, in which case the packager 104 does not wait until the current content encryption key has expired before applying the new content encryption key.

In one embodiment, the WFM 102 pushes the new content encryption key to the packager 104 when the current content encryption key is deemed to be no longer secure (e.g., if the content encryption key has been compromised). The packager 104 waits until the next available encryption boundary before applying the new content encryption key, and then notifies the WFM 102 of the exact boundary at which it expired the previous content encryption key. In one embodiment, the encryption boundary is a segment boundary. In one embodiment the segment boundaries are based on a fixed number of bytes of data. In another embodiment the segment boundaries are based on a fixed number of video key frames. The lifespan of the new content encryption key may be aligned to the periodic use period boundaries of the previous content encryption keys. In one embodiment, the expiration of the new content encryption key is set to the expiration time of the previous content encryption key. Thus if the new content encryption key was applied when the previous content encryption key had 10 minutes left in its lifespan, for example, then the lifespan of the new content encryption key is set to 10 minutes. In another embodiment, the expiration of the new content encryption key is set to the next periodic expiration time which is greater than half the fixed expiration period duration. Thus, if the lifespan of content encryption keys is 60 minutes and the previous content encryption key had 10 minutes left in its lifespan, for example, then the lifespan of the new content encryption key is set to 70 minutes (10+60) because the remaining time of 10 minutes is less than half the fixed expiration period duration (60/2=30).

In one embodiment, the packager 104 notifies the client 110 of a key change by prepending a header to the encrypted content which contains a flag that describes the expiration of the previous key. In one embodiment, the header may be a Microsoft PlayReady header. In another embodiment, the header may be an MPEG/3GP DASH header. In another embodiment, the header may be a proprietary segment format header. In another embodiment, the packager 104 notifies the client 110 of the key change by updating a manifest file that describes the encrypted content with a flag that describes the expiration of the previous key. In one embodiment, the manifest may be an m3u8 file. In another embodiment, the manifest may be a Smooth Streaming manifest file. In another embodiment, the manifest may be a DASH MPD file. In another embodiment, the packager 104 notifies the client 110 of the key change in the file name of the encrypted content by appending a flag that describes the expiration of the previous key.

Figure 2:
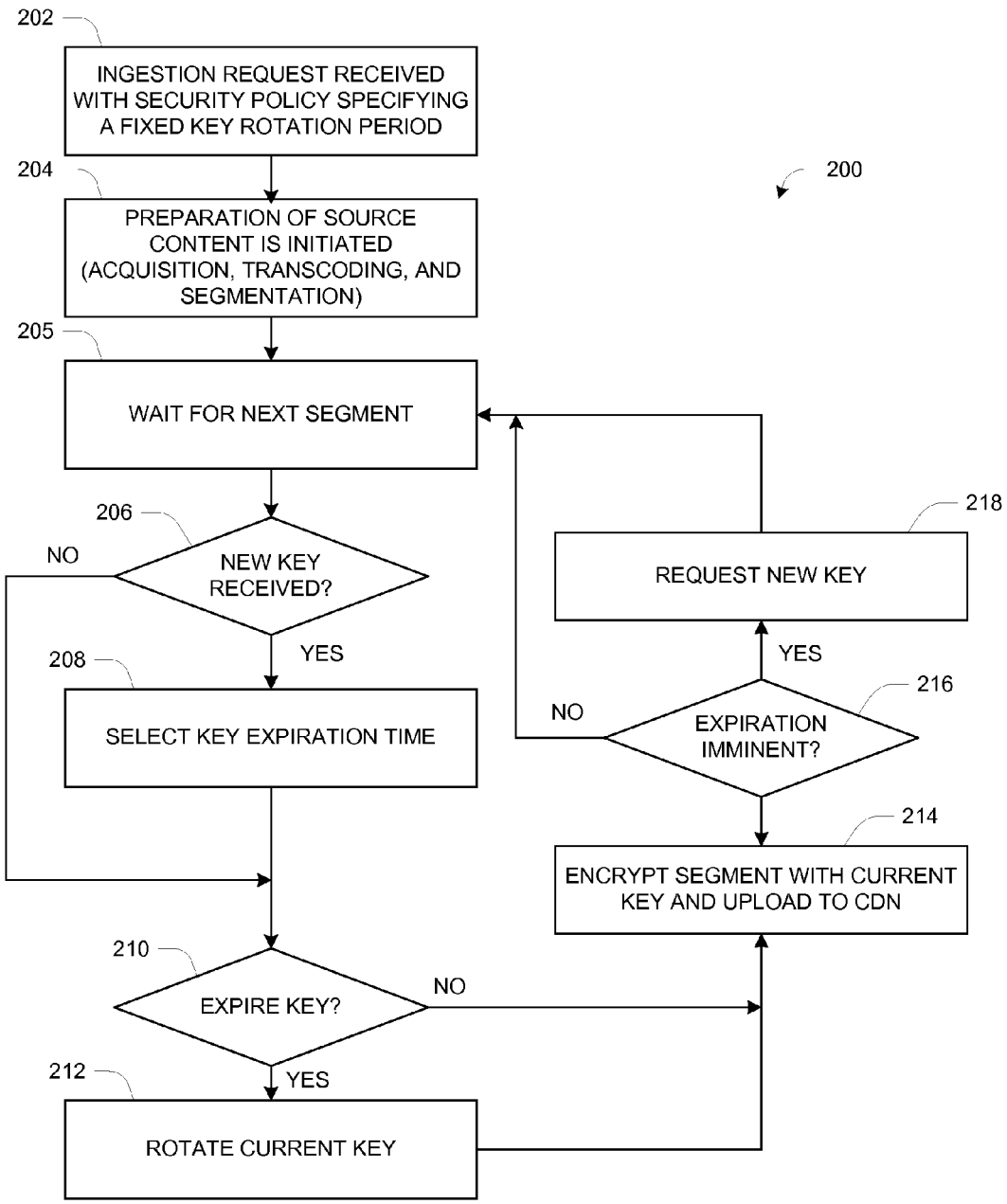
FIG. 2 is a flow diagram showing content encryption and uploading using content encryption key rotation.

FIG. 2 is a flow chart 200 describing a process for obtaining and rotating content encryption keys in a packager 104. In step 202, the WFM 102 receives an ingestion request from a CMS 112. In one embodiment, the request is an HTTP POST of XML data containing information including, but not limited to, transcode parameters, segmentation parameters, encryption parameters, source content location, and CDN parameters. In one embodiment, the WFM 102 may have predefined profiles for media preparation, content encryption, and CDN upload which are referenced in the ingestion request. In one embodiment the encryption parameters include a fixed period duration for key rotation.

It should be noted that the fixed period duration for key rotation may be viewed as a "target" period, as the packager 104 may not expire a key on the exact boundary. Generally, the packager 104 will not expire a key earlier than the end of a target period.

In step 204, the WFM 102 instructs the packager 104 to begin preparation of the content. A packager 104 begins acquiring the source content, transcoding the source content and segmenting the source content. As each segment is produced, it is delivered to the packager 104 responsible for encrypting the prepared content.

In step 205, the packager 104 responsible for encryption waits for new segments to become available. Once a new segment becomes available, processing proceeds to step 206 where this packager 104 checks to see if a new content encryption key has been received from the WFM 102. The content encryption key may be an initial content encryption key provided by the WFM 102 with the initial content preparation request. The content encryption key may be received in response to a content encryption key request from the packager 104 (originating from step 218). The content encryption key may be received via a proactive push from the WFM 102 in anticipation of a periodic content encryption key expiration event. The content encryption key may be an unsolicited content encryption key pushed by the WFM 102 as a security precaution necessitated by security policies (e.g., the current content encryption key was compromised or the current content encryption was found to be not sufficiently random).

If a new content encryption key was received, processing proceeds to step 208 where the expiration times for the current content encryption key and the new content encryption key are determined. If the new content encryption key is an initial content encryption key or a regularly scheduled update in advance of a periodic content encryption key expiration (either requested by the packager 104, or pushed proactively by the WFM 102), the lifespan is set to the fixed period duration. If the new content encryption key is not a regularly scheduled update and must be applied as soon as possible, the expiration of the current content encryption key and the new content encryption key are calculated. In one embodiment, the new content encryption key is applied at the next segment boundary. In one embodiment, the lifespan of the new content encryption key is set to the remainder of the lifespan of the current content encryption key. In another embodiment, the lifespan of the new content encryption key is rounded up to the remainder of the lifespan of the current content encryption key plus one fixed key rotation period duration. Once the content encryption key expirations have been set, processing proceeds to step 210.

In step 210, executed after step 208 or after step 206 when no new content encryption key is received, the packager 104 checks the expiration of current content key to see if a new key should be applied. If the current content encryption key has not yet expired or if a replacement content encryption key has not yet been obtained, processing proceeds to step 214. If the current content encryption key needs to be expired and a replacement content encryption key is available, processing proceeds to step 212 where the current content encryption key is expired and replaced with the pending content encryption key. The key expiration time from the WFM 102 may be viewed as a "suggested" expiration time, as the packager 104 may not be able to expire the key at the exact specified time. In one embodiment, the packager 104 notifies the WFM 102 of the exact time (segment number) at which a new key took effect (i.e., began to be used to encrypt content segments). In this case, the WFM 102 may wait to push the new key to the license server 106 only after receiving confirmation from the packager 104 that the new key has taken effect. In one embodiment, the IV is reinitialized when the content encryption key is expired. In another embodiment, when content encryption key is expired, the packager 104 continues to use the existing IV stream. Once the new content encryption key is in place, processing proceeds to step 214. In step 214, the segment received in step 205 is encrypted using the current content encryption key and the cipher specified in the ingestion request. Once the segment has been encrypted it is uploaded to the CDN 108 and processing proceeds to step 216.

In step 216, the packager 104 checks to see if the current content encryption key is going to expire in the near future. In one embodiment, when the current content encryption key is about to expire, the packager 104 proactively requests a new content encryption key ahead of time to prevent any interruption of encryption services. If the current content encryption key is not close to expiring, processing proceeds back to step 205 where the packager 104 waits for the next segment which needs to be encrypted. If the current content encryption key is within a fixed threshold of expiring, processing proceeds to step 218 where the packager 104 requests a new content encryption key from the WFM 102. In one embodiment, the threshold is set as a fixed amount of wall clock time before the current content encryption key will expire (e.g., 1 minute prior to the expiration of the current content encryption key). In another embodiment, the threshold is set as a fixed number of segments before the current content encryption key will expire (e.g., 6 segments before the expiration of the current content encryption key, where 10 second fixed duration segments would yield a threshold of approximately 1 minute). In another embodiment, the threshold is set as a fixed percentage of the fixed period content encryption key lifespan (e.g., when the lifespan of the current content encryption key is 90% complete). Once the request for a new content encryption key has been sent in step 218, processing proceeds back to step 205 where the packager 104 waits for the next segment which needs to be encrypted.

Figure 3:
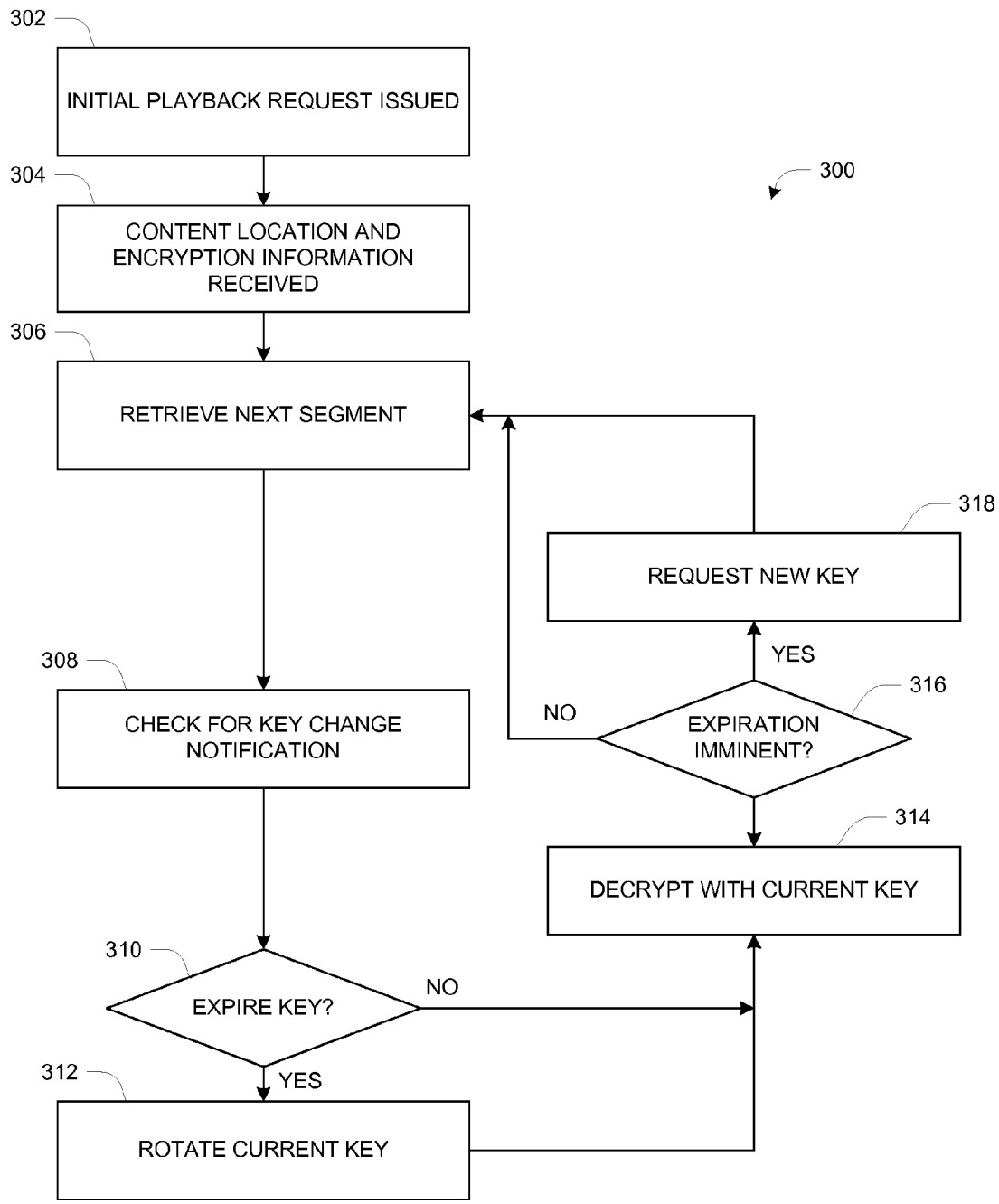
FIG. 3 is a flow diagram showing content downloading and decryption using content encryption key rotation.

FIG. 3 is a flow chart 300 describing a process for detecting the rotation of content encryption keys and retrieving updated content encryption keys. In step 302, the client 110 issues a playback request to the WFM 102. In one embodiment, the initial playback request may require registration of the client 110, user login, or some other authentication mechanism. In step 304, the client 110 retrieves and parses the content information, including content formats, content bitrates, content locations, content encryption keys, and content encryption key expiration. In one embodiment, the WFM 102 and license server 106 are deployed on the same physical machine with the ability to function through a single software interface when dealing with the client 110, and the WFM 102 may return all the necessary information, including content formats, content bitrates, content locations, content encryption keys, and content encryption key expiration, to the client 110. In another embodiment, the WFM 102 and license server 106 are deployed separately, and the client 110 must make a first request to the WFM 102 to retrieve content formats, content bitrates, content locations, and the license server 106 location. The client 110 then makes a second request to the license server 106 to retrieve content encryption keys and content encryption key expiration information.

In one embodiment, the retrieval of content encryption keys is performed over a secure channel. In one embodiment, the channel is secured using HTTPS. In another embodiment, the channel could be secured with a proprietary encryption mechanism. There are numerous ways to secure a communications channel, as should be known to those skilled in the art. Any method for securing a communications channel may be applied in step 304. In one embodiment, the channel requires authentication of the client device 110. In one embodiment, authentication is performed using SSL client authentication. In another embodiment, authentication is performed using proprietary certificate validation procedures. In another embodiment, authentication is performed using symmetric key encryption using white-box encryption methods. In another embodiment, user login credentials are passed over the secure channel. There are numerous ways to authenticate a client device 110, as should be known to those skilled in the art. Any method for authenticating a client device 110 may be applied in step 304. Once the initial playback response message processing has completed, processing proceeds to step 306.

In step 306, the client 110 retrieves the next available segment from the CDN 108. In one embodiment, the first available segment is specified by the WFM 102 in the initial playback response message. In another embodiment, the first available segment is specified in a manifest file retrieved from the CDN 108. In one embodiment, subsequent segments are identified based on sequential segment numbering using a well-known file naming scheme. In another embodiment, subsequent segments are identified by a manifest file in the CDN 108. In another embodiment, subsequent segments are identified based on the relative wall clock time in which they are generated, by performing directory listings or using a watched directory to determine when new segments become available.

Once the new segment is retrieved, processing proceeds to step 308 where the client 110 checks to see if a key change is signaled, i.e., a key change was requested outside of any fixed duration lifespan. This can occur for security reasons as mentioned above. In one embodiment, the packager 104 notifies the client 110 of the key change by prepending a header to the encrypted content which contains a flag that describes the expiration of the previous content encryption key and the content encryption key identifier of the new content encryption key to be applied. In one embodiment, the header may be a Microsoft PlayReady header. In another embodiment, the header may be an MPEG/3GP DASH header. In another embodiment, the header may be a proprietary segment format header. In another embodiment, the packager 104 notifies the client 110 of the key change by updating a manifest file that describes the encrypted content with a flag that describes the expiration of the previous content encryption key and the content encryption key identifier of the new content encryption key to be applied. In one embodiment, the manifest may be an m3u8 file. In another embodiment, the manifest may be a Smooth Streaming manifest file. In another embodiment, the manifest may be a DASH MPD file. In another embodiment, the packager 104 notifies the client 110 of the key change in the file name of the encrypted content by appending a flag that describes the expiration of the previous content encryption key and the content encryption key identifier of the new content encryption key to be applied. If a content encryption key change request is detected, the client notes the need to expire the current content encryption key and the content encryption key identifier of the new key to be used. The client 110 then proceeds to step 310.

In step 310, the client 110 checks the expiration of current content key to see if a new key should be applied. There are two cases—normal period-based expiration, and an explicit key change notification received in step 308 that applies to the current segment being decrypted. If the current content encryption key has not yet expired, processing proceeds to step 314. If the current content encryption key needs to be expired, processing proceeds to step 312 where the key is "rotated", i.e., the current content encryption key is expired and a new one is put into use. The client 110 first checks whether the content encryption key corresponding to a key change notification in step 308 has already been retrieved by prefetching as described below with reference to step 318. If the new content encryption key has already been retrieved, the current content encryption key is replaced with that pending content encryption key. If the new content encryption key has not been retrieved yet (e.g., due to early expiration of the current content encryption key for security reasons, or content encryption key retrieval failures in step 318), the client 110 must issue a new content encryption key request to the license server 106 to retrieve the new content encryption key, then replace the current content encryption key with the newly retrieved content encryption key.

In one embodiment, the encryption algorithm initialization vector (IV) is reinitialized when the content encryption key is expired. In another embodiment, when content encryption key is expired, the client 110 continues to use the existing IV stream.

Once the new content encryption key is in place, processing proceeds to step 314. In step 314, the segment retrieved in step 306 is decrypted using the current content encryption key and the cipher specified in the initial playback response message. Once the segment has been decrypted it is passed to the media player for rendering and processing proceeds to step 316.

In step 316, the client 110 checks to see if the current content encryption key is going to expire in the near future or if a content encryption key change request for a future segment was detected in step 308. In one embodiment, when the current content encryption key is about to expire, the client 110 proactively requests a new content encryption key ahead of time to prevent any latency in or interruption of decryption services. If the current content encryption key is not close to expiring and a content encryption key change request was not detected in step 308, processing proceeds back to step 306 where the client 110 begins retrieving the next segment. If the current content encryption key is within a fixed threshold of expiring or a content encryption key change request was detected in step 308, processing proceeds to step 318 where the client 110 requests a new content encryption key from the license server 106. In one embodiment, the threshold is set as a fixed amount of wall clock time before the current content encryption key will expire. In another embodiment, the threshold is set as a fixed number of segments before the current content encryption key will expire. In another embodiment, the threshold is set as a fixed percentage of the fixed period content encryption key lifespan. Once the request for a new content encryption key has been sent in step 318, processing proceeds back to step 306 where the client 110 begins retrieving the next segment.

While various embodiments of the invention have been particularly shown and described, it will be understood by those skilled in the art that various changes in form and details may be made therein without departing from the scope of the invention as defined by the appended claims.

What is claimed is:

1. A method for managing secure distribution of content, comprising:
   generating a series of content encryption keys and providing them serially to a packaging server for encrypting a content item, each content encryption key provided upon expiration of a period of use of a serially preceding content encryption key, the packaging server generating packaged content for delivery to client devices via a content delivery network, the packaged content including or accompanied by key expiration information usable by the client devices to identify transitions between sections of the packaged content encrypted by different ones of the content encryption keys; and
   providing the content encryption keys to a license server for delivery to the client devices for use in decrypting the content item, the license server being operative to establish that a requesting client device is authorized to access the content item, the license server being further operative to securely deliver the content encryption keys to a requesting client device whose authorization to access the content item has been established.

2. The method of claim 1, wherein the content is audio/video content.

3. The method of claim 1, wherein the content is encrypted using an encryption algorithm selected from AES128, HC128, and RC4.

4. The method of claim 3, further comprising: resetting an initialization vector of the encryption algorithm when transitioning to use of each successive content encryption key.

5. The method of claim 1, wherein the content encryption keys are provided to the packaging server through a secure interface secured using Secure Sockets Layer or other security protocol.

6. The method of claim 1, wherein a next content encryption key is pushed to the packaging server when it is determined that a current content encryption key should be expired as a security precaution.

7. The method of claim 1, wherein providing the content encryption keys includes pushing a content encryption key and a suggested expiration time to the packaging server.

8. The method of claim 7, wherein the content encryption key and suggested expiration time are pushed only in response to a request for a new content encryption key from the packaging server.

9. The method of claim 8, wherein the packaging server requests a new key in anticipation of expiration of a current key.

10. The method of claim 7, further including receiving a notification from the packaging server of an exact expiration time at which a new content encryption key took effect.

11. The method of claim 10, wherein the new content encryption key is provided to the license server only upon receiving the notification from the packaging server.

12. The method of claim 1, wherein the client device is notified at session initiation of a target fixed period for content key expiration.

13. The method of claim 1, wherein the client device is notified in real time of content key expiration.

14. The method of claim 13, wherein the packaging server provides the key expiration information by inserting a key change notification into a content encryption metadata header as part of the unencrypted portion of the encrypted file, the content encryption metadata header.

15. The method of claim 13, wherein the packaging server provides the key expiration information by inserting a key change notification into a content manifest file accessible to the client devices, the content manifest file being selected from an m3u8 file, an IIS Smooth Streaming manifest file, a DASH MPD file and a proprietary manifest file.

16. The method of claim 13, wherein the packaging server provides the key expiration information by inserting a key change notification into the file name of the segment files being generated.

17. The method of claim 1, wherein the content encryption key is provided to the license server through a secure interface secured using Secure Sockets Layer or other security protocol.

18. The method of claim 1, wherein the series of content encryption keys are versioned using monotonically increasing integer values while maintaining a direct correlation between an encryption key version and a segment number or segment duration associated with segments of the packaged content.

19. The method of claim 18, wherein the license server is operative to allow client devices to request previously used content encryption keys and key expiration information.

20. The method of claim 1, wherein the license server distributes content encryption keys and content encryption key expiration information to client devices using a secure channel.

21. The method of claim 20, wherein the secure channel is secured using a selected one of Secure Sockets Layer and a token-based technique using a token encrypted with a symmetric key.

22. The method of claim 21, wherein the token-based technique employs white box encryption to encrypt the token.

23. The method of claim 1, wherein the license server sends content encryption keys and expiration information only in response to requests from the client devices.

24. The method of claim 1, wherein the license server is operative when establishing that a requesting client device is authorized to access the content item to verify client device identity and content access rights before returning content encryption key or expiration information.

25. A computerized device operable as a workflow manager for managing secure distribution of content, comprising:
    memory operative to store computer program instructions;
    one or more processors;
    input/output interface circuitry; and
    interconnect circuitry coupling the memory, processors and input/output interface circuitry together,
    wherein the processors are operative to execute the computer program instructions from the memory to cause the computerized device to:
        generate a series of content encryption keys and providing them serially to a packaging server for encrypting a content item, each content encryption key provided upon expiration of a period of use of a serially preceding content encryption key, the packaging server generating packaged content for delivery to client devices via a content delivery network, the packaged content including or accompanied by key expiration information usable by the client devices to identify transitions between sections of the packaged content encrypted by different ones of the content encryption keys; and
        provide the content encryption keys to a license server for delivery to the client devices for use in decrypting the content item, the license server being operative to establish that a requesting client device is authorized to access the content item, the license server being further operative to securely deliver the content encryption keys to a requesting client device whose authorization to access the content item has been established.

26. A method for packaging content for secure distribution, comprising:
    receiving a series of content encryption keys and using them to encrypt a content item, each content encryption key provided upon expiration of a period of use of a serially preceding content encryption key, the content encryption keys being provided separately to a license server for delivery to client devices for use in decrypting the content item, the license server being operative to establish that a requesting client device is authorized to access the content item, the license server being further operative to securely deliver the content encryption keys to a requesting client device whose authorization to access the content item has been established; and
    generating packaged content and providing it to a content delivery network for delivery to the client devices, the packaged content including the content item as encrypted and being accompanied by key expiration information usable by the client devices to identify transitions between sections of the packaged content encrypted by different ones of the content encryption keys.

27. The method of claim 26, wherein a next content encryption key is pushed to the packaging server when it is determined that a current content encryption key should be expired as a security precaution.

28. The method of claim 26, wherein providing the content encryption keys includes pushing a content encryption key and a suggested expiration time to the packaging server.

29. The method of claim 28, wherein the content encryption key and suggested expiration time are pushed only in response to a request for a new content encryption key from the packaging server.

30. The method of claim 29, wherein the packaging server requests a new key in anticipation of expiration of a current key.

31. The method of claim 28, wherein the content encryption keys are received from a workflow manager, and further including sending a notification to the workflow manager of an exact expiration time at which a new content encryption key took effect.

32. The method of claim 26, wherein the client device is notified in real time of content key expiration.

33. The method of claim 32, wherein the packaging server provides the key expiration information by inserting a key change notification into a content encryption metadata header as part of the unencrypted portion of the encrypted file, the content encryption metadata header.

34. The method of claim 32, wherein the packaging server provides the key expiration information by inserting a key change notification into a content manifest file accessible to the client devices, the content manifest file being selected from an m3u8 file, an IIS Smooth Streaming manifest file, a DASH MPD file and a proprietary manifest file.

35. The method of claim 26, wherein the series of content encryption keys are versioned using monotonically increasing integer values while maintaining a direct correlation between an encryption key version and a segment number or segment duration associated with segments of the packaged content.

36. The method of claim 26, wherein the license server is operative when establishing that a requesting client device is authorized to access the content item to verify client device identity and content access rights before returning content encryption key or expiration information.

37. A computerized device operable as a packaging server for packaging content for secure distribution, comprising:
    memory operative to store computer program instructions;
    one or more processors;
    input/output interface circuitry; and
    interconnect circuitry coupling the memory, processors and input/output interface circuitry together,
    wherein the processors are operative to execute the computer program instructions from the memory to cause the computerized device to:
        receive a series of content encryption keys and using them to encrypt a content item, each content encryption key provided upon expiration of a period of use of a serially preceding content encryption key, the content encryption keys being provided separately to a license server for delivery to client devices for use in decrypting the content item, the license server being operative to establish that a requesting client device is authorized to access the content item, the license server being further operative to securely deliver the content encryption keys to a requesting client device whose authorization to access the content item has been established; and
        generate packaged content and providing it to a content delivery network for delivery to the client devices, the packaged content including the content item as encrypted and being accompanied by key expiration information usable by the client devices to identify transitions between sections of the packaged content encrypted by different ones of the content encryption keys.

38. A system for ingestion of content and packaging and delivery of the content to client devices via a content delivery network, comprising:

a set of one or more server computers collectively coupled to a source of the content and to the content delivery network and including a packaging server, a workflow manager and a license server;

the packaging server being operative to (i) receive a series of content encryption keys from the workflow manager and use them to encrypt a content item, each content encryption key provided upon expiration of a period of use of a serially preceding content encryption key, and (ii) generate packaged content and providing it to the content delivery network for delivery to the client devices, the packaged content including the content item as encrypted and being accompanied by key expiration information usable by the client devices to identify transitions between sections of the packaged content encrypted by different ones of the content encryption keys;

the workflow manager being operative to (i) generate the series of content encryption keys and provide them serially to the packaging server for encrypting the content item, each content encryption key provided upon expiration of a period of use of a serially preceding content encryption key, and (ii) provide the content encryption keys to the license server for delivery to the client devices for use in decrypting the content item; and the license server being operative to (i) establish that a requesting client device is authorized to access the content item, and (ii) securely deliver the content encryption keys to a requesting client device whose authorization to access the content item has been established by the license server, the content encryption keys being delivered for use by the requesting client device in decrypting the content item.

* * * * *